United States Patent [19]
Mehl

[11] Patent Number: 5,111,376
[45] Date of Patent: May 5, 1992

[54] VOLTAGE BALANCING CIRCUIT
[75] Inventor: Byron R. Mehl, Belvidere, Ill.
[73] Assignee: Sundstrand Corporation, Rockford, Ill.
[21] Appl. No.: 607,811
[22] Filed: Nov. 1, 1990
[51] Int. Cl.[5] ............................................. H02M 7/44
[52] U.S. Cl. ........................................ 363/71; 363/95; 307/58; 307/82; 307/103
[58] Field of Search ...................... 363/65, 71, 72, 95, 363/97, 98; 307/58, 59, 82, 85, 86, 87, 103

[56] References Cited
U.S. PATENT DOCUMENTS 3,354,376 11/1967 Corey et al. .
3,876,923 4/1975 Humphrey et al. .
3,993,943 11/1976 Bratton et al. .......................... 363/71
4,062,057 12/1977 Perkins et al. .......................... 363/71
4,519,022 5/1985 Glennon .................................. 363/41

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

Prior voltage balancers for three-phase inverters are useful only with inverters which are not in wide use today. In order to overcome this problem, a voltage balancing circuit for a commonly used inverter balances N phase voltages produced on N output lines. The circuit includes switch controllers coupled to the N output lines for sensing the magnitude of each phase voltage and N−1 voltage combining circuits responsive to the switch controllers and coupled to N−1 output lines for modifying the voltage magnitudes on the N−1 output lines whereby the N phase voltages are maintained within a range of voltage magnitudes.

7 Claims, 4 Drawing Sheets

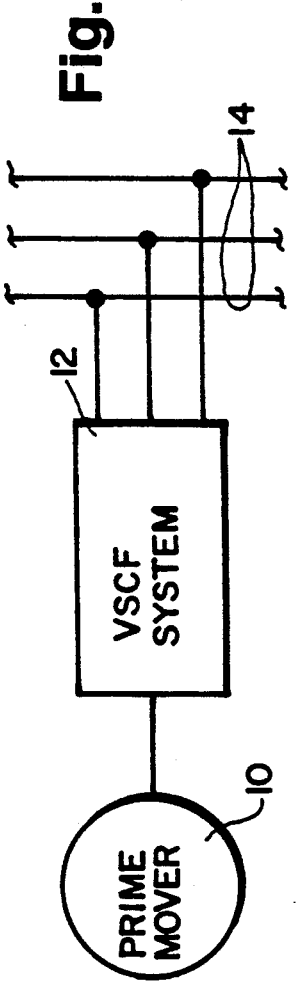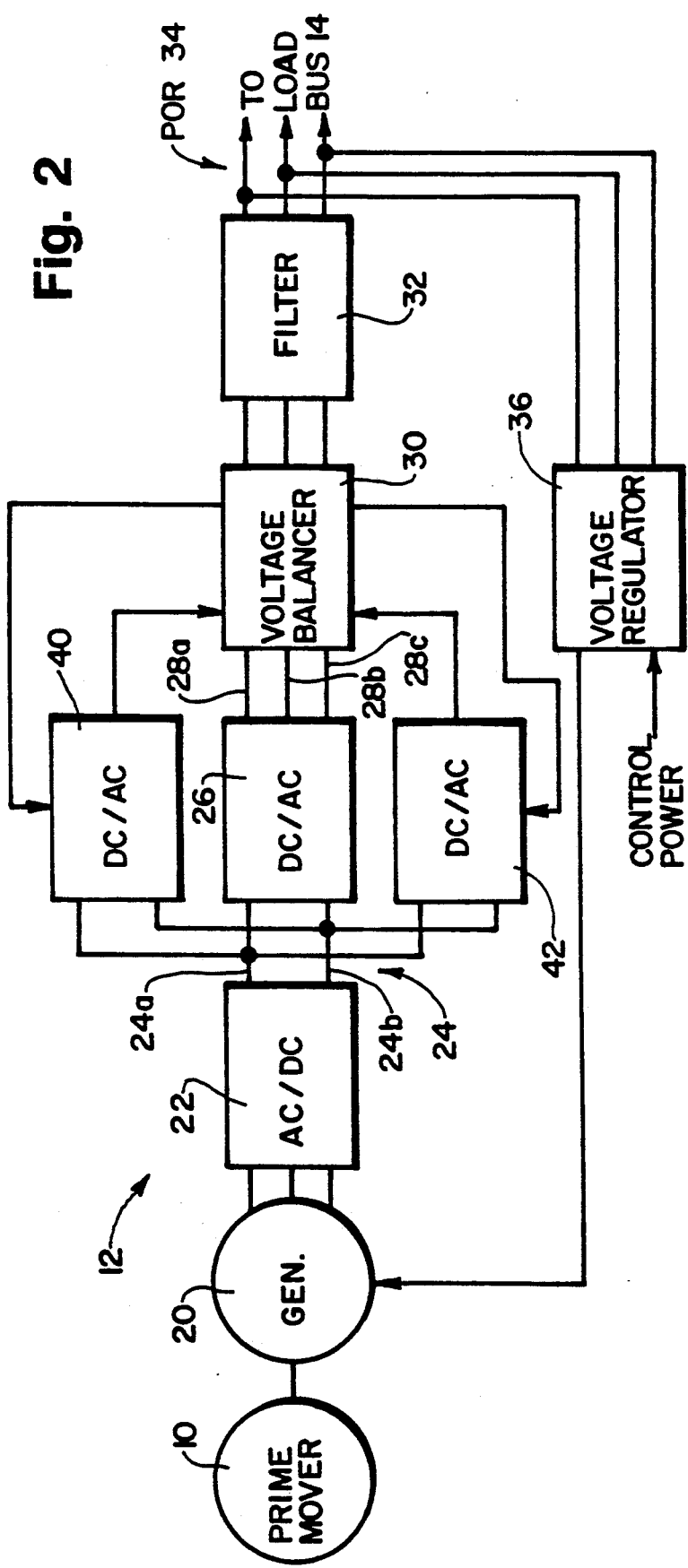

VOLTAGE BALANCING CIRCUIT

TECHNICAL FIELD

The present invention relates generally to AC power sources, and more particularly to a voltage balancing circuit for an inverter.

BACKGROUND ART

Inverters are often used in power conversion systems to produce AC power. For example, in a variable-speed, constant-frequency (VSCF) power generating system, a variable-frequency AC output of a brushless, synchronous generator is converted into DC power by an AC/DC converter and the resulting DC power is converted by an inverter into constant-frequency AC output power. Typically, such inverters are of the three-phase type wherein three-phase output voltages are produced by the inverter. In a VSCF system of this type, a voltage regulator detects the average of the phase output magnitudes and delivers a controlled current to an exciter of the brushless generator to in turn control the output voltage of the generator, and hence the average of the three-phase voltages produced by the inverter.

Occasionally, an unbalanced condition can arise in loads connected to the inverter output. This, in turn, can cause the output voltage magnitudes to become unbalanced or substantially unequal. Such a condition is undesirable where output voltage magnitudes must be held to within a certain range of a specified level. During an unbalanced load condition where one of the output voltage magnitudes decreases a substantial amount relative to the remaining two output voltages, the three-phase output voltages will be increased by the voltage regulator so as to maintain the average of the magnitudes at the specified level. This does not, however, cause the differences in level between the individual phase voltages to be reduced so that they are within a specified range.

Corey et al., U.S. Pat. No. 3,354,376 discloses a multi-phase inverter which produces three-phase output voltages. The inverter includes a pair of single-phase inverters which are coupled to a Scott-T transformer having three outputs at which the phase voltages are produced. A regulator includes circuits which sense the voltage amplitudes between the three phases. Two of the sensed voltage amplitudes are used to control the amplitudes of the outputs of the single-phase inverters and the remaining sensed voltage amplitude is used to control the phase displacement between the outputs of the two inverters. By controlling the amplitudes and phase displacement in this fashion, the three phases may be regulated and balanced.

As should be evident from the foregoing discussion, the Corey system is capable of only regulating a three-phase output produced by single-phase inverters coupled to a Scott-T transformer. Since such types of polyphase inverters are not in wide usage currently, this system is of limited usefulness, at best.

SUMMARY OF THE INVENTION

In accordance with the present invention, a voltage balancing circuit balances the outputs of a polyphase inverter in a simple and inexpensive fashion.

More particularly, a voltage balancing circuit for balancing N phase voltages produced on N output lines includes means coupled to the N output lines for sensing the magnitude of each phase voltage and N−1 voltage combining circuits responsive to the sensing means and coupled to N−1 output lines for modifying the voltage magnitude on the N−1 output lines whereby the N phase voltages are maintained within a range of voltage magnitudes. If desired, the voltage balancing circuit may alternatively include N voltage combining circuits which, in addition to the voltage balancing noted above, implement a different function, such as active filtering.

In a more specific sense, the voltage balancing circuit of the present invention balances three-phase voltages produced by an inverter on three output lines wherein the inverter receives DC power on DC link conductors from a brushless generator that develops variable-frequency voltages and an AC/DC converter coupled to the brushless generator. First and second switch controllers receive signals representing the magnitudes of the voltages on the output lines of the inverter. A voltage regulator is coupled to at least one of the output lines of the inverter for regulating the voltages produced across the DC link conductors to in turn control an average magnitude of the three-phase voltages. First and second inverters controlled by the first and second switch controllers are coupled to the AC/DC converter and first and second transformers are coupled between the first and second inverters and two of the output lines. The switch controllers operate the inverters to produce supplemental AC power which is combined by the transformers with two of the phase voltages so that the magnitudes of the three phase voltages are maintained at a substantially equal level.

The voltage balancing circuit of the present invention is particularly adapted to control commonly used inverters and is particularly simple in construction.

BRIEF DESCRIPTION OF THE DRAWINGS

FIG. 1 is a block diagram of a prime mover in conjunction with a variable speed, constant-frequency (VSCF) power conversion system;

FIG. 2 is a block diagram illustrating the VSCF system of FIG. 1 in greater detail;

DESCRIPTION OF THE PREFERRED EMBODIMENT

Figure 3:
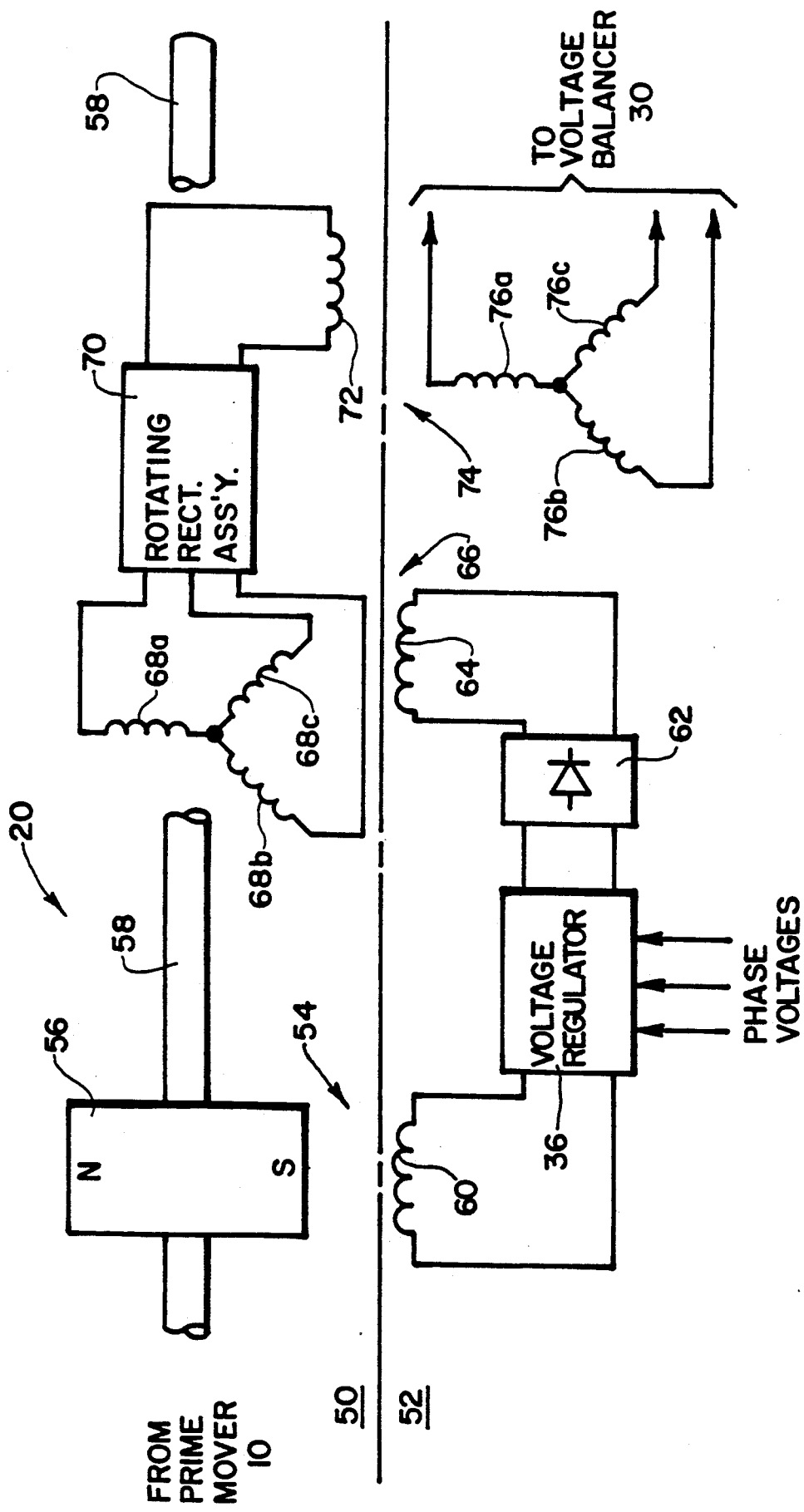
FIG. 3 comprises a combined schematic and block diagram of the generator 20 and voltage regulator 36 of FIG. 2.

Referring now to FIG. 1, a prime mover 10, such as an aircraft jet engine, develops variable-speed motive power which is converted by a VSCF system 12 into constant-frequency AC electrical power on a load bus 14. It should be noted that various contactors for connecting the VSCF system 12 to the load bus 14 are not shown for the sake of simplicity.

Referring now to FIG. 2, the VSCF system 12 includes a brushless, synchronous generator 20 which converts the variable-speed motive power produced by the prime mover 10 into variable-frequency power. An AC/DC converter 22 which may be, for example, a rectifier bridge of conventional design, converts the variable-frequency power into DC power on a DC link 24 comprising first and second DC link conductors 24a, 24b. The DC link conductors 24a, 24b are coupled to a DC/AC converter 26 which may be a conventional inverter of the three-phase type which produces three-phase output voltages on a set of output lines 28a-28c. The output lines 28a-28c are coupled to a voltage balancer 30 and thence to an optional filter 32 which is in turn coupled to the load bus 14.

Three-phase voltages produced at a point of regulation (POR) 34 near the load bus 14 are sensed by a voltage regulator 36 which in turn delivers a controlled current to an exciter, described hereinafter, of the generator 20. If desired, the POR 34 may instead be located at the output of the DC/AC converter 26 or at the output of the voltage balancer 30 or at another point.

First and second supplementary inverters 40, 42 are coupled to the DC link conductors 24a, 24b and develop first and second supplementary AC voltages which are in turn combined by the voltage balancer 30 with the output voltages on two of the output lines 28a-28c. The voltages produced by the supplementary inverters 40, 42 are controlled in accordance with the voltage magnitudes on the lines 28a-28c in a fashion hereinafter described in greater detail.

Referring now to FIG. 3, the generator 20 includes rotor structures mounted on a rotor 50 and stator structures mounted in a stator 52. A permanent magnet generator (PMG) 54 includes a rotor permanent magnet structure 56 which, when rotated, causes an AC voltage to be induced in an armature winding 60. The AC voltage comprises control power which is applied to the voltage regulator 36. In conventional fashion, the regulator 36 and a rectifier 62 develop a controlled AC current in accordance with the average of the three-phase voltage magnitudes at the POR 34. The controlled current is provided to a field winding 64 of an exciter 66 of the generator 20. Three-phase exciter armature windings 68a-68c are mounted on the shaft 58. When the windings 68a-68c are rotated as current is flowing in the exciter field winding 64, three-phase AC voltages are induced in the winding 68a-68c which are rectified by a rotating rectifier assembly 70 to produce DC power. This DC power is applied to a main generator portion field winding 72 of a main generator portion 74. Rotation of the field winding 72 while current is flowing therein causes three-phase voltages to be developed in a set of main generator portion armature windings 76a-76c. The power produced in these windings is applied to the voltage balancer 30.

Figure 4:
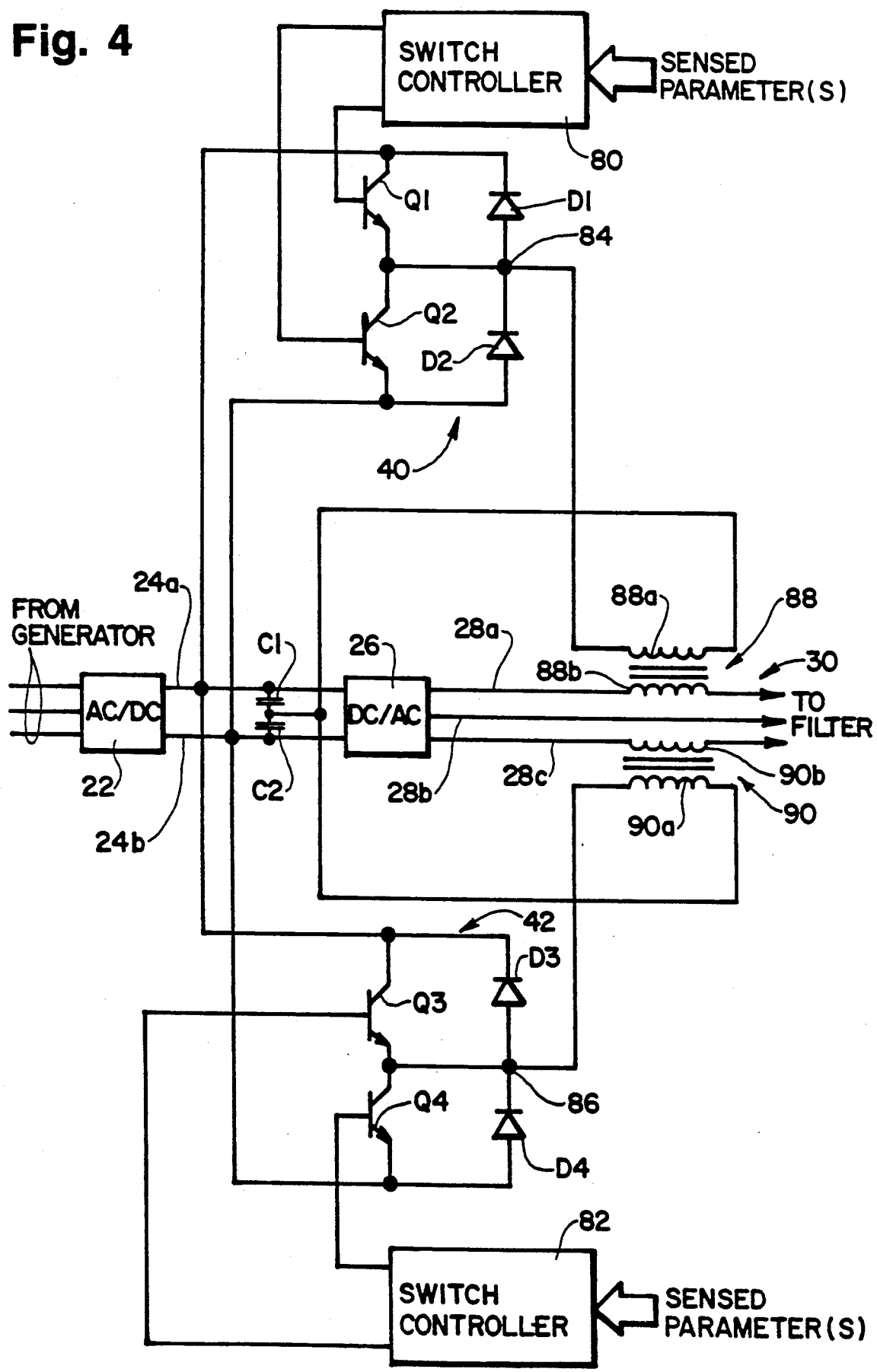
FIG. 4 is a combined simplified schematic and block diagram illustrating the voltage balancer of FIG. 2 in greater detail.

Referring now to FIG. 4, each of the DC/AC converters 40, 42 comprises a pair of controllable power switches Q1, Q2 and Q3, Q4, respectively, which are connected across the DC link conductors 24a, 24b. Flyback diodes D1-D4 are connected in anti-parallel relationship across the switches Q1-Q4, respectively. It should be noted that base biasing and snubber circuits for the converters 40 and 42 are not shown for the sake of simplicity. The switches Q1 and Q2 are operated by a switch controller 80 which is responsive to one or more sensed parameters, for example, the magnitude of the voltages developed by the inverter 26. In like fashion, the switches Q3 and Q4 are operated by a switch controller 82 which is responsive to the same or different parameters that are sensed by the switch controller 80.

In the perferred embodiment, the switch controllers 80, 82 operate the switches Q1, Q2 and Q3, Q4 in a pulse-width modulated (PWM) mode of operation. It should be noted that the switches may alternatively be operated in a different mode, if desired, such as a linear mode in which the switches Q1-Q4 conduct sinusoidal currents.

Outputs 84, 86 of the converters 40, 42 are coupled to primary windings 88a, 90a of a pair of transformers 88, 90, respectively. Second ends of the windings 88a, 90a are coupled to a neutral voltage produced at a junction between series-connected first and second capacitors C1, C2 which are coupled across the DC link conductors 24a, 24b. The primary windings 88a, 90a are magnetically linked with secondary windings 88b, 90b of the transformers 88, 90, respectively. The secondary windings 88b, 90b are coupled in series with two of the output lines from the inverter 26.

In operation, when the voltage produced on one of the lines 28a-28c attempts to vary from a reference level, supplemental power is transferred between one or both of the inverters 40, 42 and the transformers 88, 90 so that an out-of-balance condition is avoided. For example, when the voltage on the line 28a attempts to drop due to unequal loading on the load bus 14, a positive supplemental voltage is developed by the inverter 40 and provided to the transformer 88. A voltage is developed across the winding 88b which augments the reduced voltage on the line 28a so that the three-phase voltages at the POR 34 are maintained at a substantially equal level. In like fashion, when the voltage on the line 28c attempts to drop due to an unbalanced load condition, the inverter 42 develops a positive supplemental AC voltage which is provided to the primary winding 90a. A supplemental voltage is developed in the secondary winding 90b which augments the voltage on the line 28c to maintain the three-phase voltages at the POR at the desired level.

When the voltage on the line 28b attempts to drop below a certain level, the inverters 40, 42 develop negative supplemental voltages which are delivered to both transformer primary windings to 88a, 90a. The voltage magnitudes developed on lines 28a, 28c are thus reduced by voltages induced in the secondary windings 88b, 90b. As a result of the reduction of all of the voltages produced at the POR 34, the voltage regulator 36, FIGS. 2 and 3, increases the level of current delivered to the exciter field winding 64 so that the voltages induced in the main generator portion armature windings 76a-76c are augmented. The voltage regulator 36 thus increases the voltage levels delivered to the rectifier 22 and hence to the inverter 26 so that the inverter output is also augmented. This augmentation causes the levels of the three-phase voltage output produced at the POR 34 to settle again at the desired level.

Operation of the voltage balancer 30 according to the present invention in the event that one or more voltage levels attempts to rise above the regulated level is identical to that described above, with the exception that the polarity of the supplemental voltages induced across the secondary windings 88b, 90b is reversed.

Figure 5:
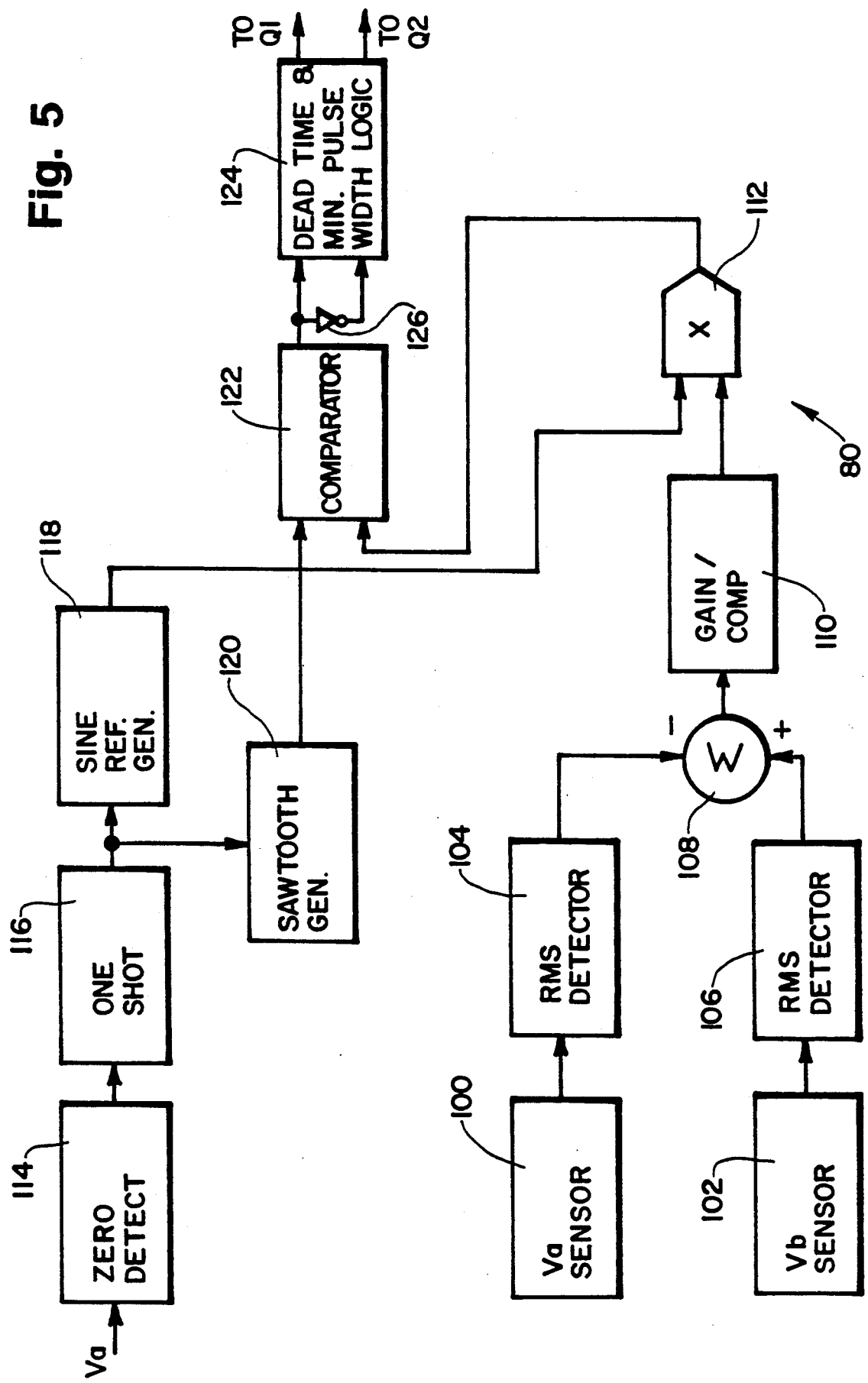
FIG. 5 comprises a block diagram of the switch controller 80 of FIG. 4.

Referring now to FIG. 5, the switch controller 80 is shown in greater detail. The controller 80 includes first and second voltage sensors 100, 102 which detect phase A and phase B voltages $V_a$, $V_b$, respectively, developed at a point of regulation (POR). First and second RMS detectors 104, 106 develop DC voltages representing the instantaneous RMS magnitudes of $V_a$ and $V_b$. These DC signals are provided to a summer 108 that develops an error signal representing the deviation of the phase A RMS magnitude from the phase B RMS magnitude.

The output of the summer 108 is coupled to a gain and compensation circuit 110 and thence to a first input of a multiplier 112. The multiplier 112 is further responsive to a reference sine wave which is sychronized to the voltage $V_a$. More particularly, the voltage $V_a$ is provided to a zero detect circuit 114 having an output coupled to a one-shot 116. The circuits 114, 116 provide reset pulses for a sine wave reference generator 118 which in turn provides the reference sine wave to a second input of the multiplier 112. The output of the one-shot 116 is also coupled to a saw tooth generator 120 that develops a saw tooth wave which is synchronized to the output of the sine wave reference generator 118.

A comparator 122 includes first and second inputs that receive the output of the multiplier 112 and the output of the saw tooth generator 120, respectively. The comparator 122 develops a pulse-width modulated (PWM) wave which is supplied in non-inverted form to a dead time and minimum pulse width logic circuit 124. The output of the comparator 122 is further inverted by an inverter 126 and is supplied in inverted form to the logic circuit 124. The logic circuit 124 imposes a fixed dead time between a falling edge of one of the waveforms delivered to the switches Q1 and Q2 and a subsequent rising edge of the other waveform provided to the switches Q1 and Q2 to prevent a shoot-through condition. In addition, the logic circuit 124 insures that the signals provided to the switches Q1 and Q2 do not violate minimum pulse-width requirements imposed by the switches Q1 and Q2.

The switch controller 82 is identical to the switch controller 80, except that the sensor 100 is replaced by a sensor which detects the voltage $V_c$ at the POR. Further, the zero detect circuit 114 is responsive to this voltage $V_c$ rather than the voltage $V_a$.

It should be noted that the switch controllers 80, 82 are illustrated as utilizing the voltage $V_b$ as a reference. If it is desired to control all three output voltages $V_a$, $V_b$, and $V_c$ to an arbitrary internal reference, an additional switch controller and transformer identical to the switch controller 80 and transformer 88 must be provided for the phase B voltage. In this case, the voltage sensor 100 is replaced by a voltage sensor which detects the voltage $V_b$ and the zero detect circuit 114 of the additional switch controller is responsive to the voltage $V_b$. In addition, the RMS detectors 106 of all of the switch controllers receive the internal reference rather than the voltage $V_b$.

It should be noted that the voltage balancing circuit of the present invention can be modified such that the inverters 40, 42 supply only one polarity of voltages to the transformers coupled to the inverter output. For example, where the output voltages are to be regulated at 115 volts RMS, the voltage regulator 36 may instead regulate the output voltages to a level of, for example, 113 volts RMS, and three inverters each identical to one of the inverters 40, 42 and coupled to transformers similar to the transformers 88, 90 may supply positive voltages which are in turn combined with the output of the inverter 26 to obtain 115 volt RMS output voltages. Alternatively, the voltage regulator 36 may regulate the output voltages at, for example, 117 volts RMS, in which case the inverters and transformers provide negative polarity voltages to maintain the output at the desired 115 volt RMS regulated level.

It can be seen that the voltage balancer of the present invention prevents a substantially unbalanced condition in a simple and effective manner. Also, the present invention controls the output voltages such that any differences in voltage levels are maintained at a low magnitude. The transformers 88, 90 may thus be small and have a high turns ratio and the switches Q1-Q4 of the inverters 40, 42 may have small ratings relative to the switches of the inverter 26. Further, the transformers 88, 90 may be integral with filter inductors connected downstream of the inverter 26 or other transformers connected to the output of the inverter 26.

Also, the voltage regulator 36 may be omitted and the AC/DC converter 22 may be implemented by a phase controlled rectifier which includes controllable diodes that are operated by a rectifier control circuit. In this case, the control circuit may be responsive to one or more of the three voltages produced at the POR to in turn regulate the the voltage developed across the DC link conductors 24a, 24b, and hence the average of the three-phase voltages developed by the inverter 26.

It should be noted that, by adding a third inverter and transformer analogous to the inverters 40, 42 and the transformers 88, 90 to the line 28b, active filtering of the inverter output appearing on the lines 28a-28c can be accomplished. Such filtering could obviate the need for the filter 32, thereby resulting in a substantial savings in size and weight of the overall VSCF system.

I claim:

1. A voltage balancing circuit for balancing first through Nth phase voltages produced on first through Nth output lines where N is an integer greater than one, comprising:

first through Nth means coupled to the first through Nth output lines, respectively, for sensing the magnitude of the first through Nth phase voltages; and N−1 voltage combining circuits responsive to the first through Nth sensing means and coupled to N−1 output lines for modifying the voltage magnitude on the N−1 output lines whereby the first through nth phase voltages are maintained within a range of voltage magnitudes.

2. The voltage balancing circuit of claim 1, wherein each voltage combining circuit comprises a transformer having a primary winding and a secondary winding coupled in series with a respective output line and N−1 means each coupled to an associated one of the primary windings for inducing a voltage therein.

3. The voltage balancing circuit of claim 2, wherein each inducing means comprises a DC/AC converter coupled to a source of DC power.

4. The voltage balancing curcuit of claim 3, wherein each DC/AC converter comprises a pulse-width modulated inverter.

5. A voltage balancing circuit for balancing three-phase voltages produced by an inverter on first, second and third output lines wherein the inverter receives DC power on DC link conductors from a brushless generator which develops variable-frequency voltages and an AC/DC converter coupled to the brushless generator, comprising:

first and second switch controllers coupled to the first and second output lines, respectively;

a voltage regulator coupled to at least one of the output lines for regulating the voltages produced across the DC link conductors to in turn control an average magnitude of the three-phase voltages;

first and second inverters coupled to the first and second switch controllers and the DC link conductors; and first and second transformers coupled between the first and second inverts and two of the output lines, whereby the switch controllers operate the inverters to produce supplemental AC power which is combined by the transformers with two of the phase voltages so that the magnitudes of the three phase voltages are maintained at substantially equal levels.

6. The voltage balancing circuit of claim 5, wherein the switch controllers operate the inverters to produce pulse-width modulated waveforms.

7. The voltage balancing circuit of claim 5, wherein each transformer includes a primary winding coupled to an inverter and a secondary winding coupled in series with an output line.

* * * * *